United States Patent
Rakshit

(10) Patent No.: US 11,269,312 B2
(45) Date of Patent: Mar. 8, 2022

(54) THREE DIMENSIONAL PRINTING VEHICLE-BASED AUTO-CORRECTION IN A STRUCTURE

(71) Applicant: INTERNATIONAL BUSINESS MACHINES CORPORATION, Armonk, NY (US)

(72) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 318 days.

(21) Appl. No.: 16/562,541

(22) Filed: Sep. 6, 2019

(65) Prior Publication Data

US 2021/0072725 A1   Mar. 11, 2021

(51) Int. Cl.
*G05B 19/4099* (2006.01)
*B33Y 50/02* (2015.01)
*B29C 64/10* (2017.01)

(52) U.S. Cl.
CPC .......... *G05B 19/4099* (2013.01); *B29C 64/10* (2017.08); *B33Y 50/02* (2014.12); *G05B 2219/49023* (2013.01)

(58) Field of Classification Search
None
See application file for complete search history.

(56) References Cited

U.S. PATENT DOCUMENTS

| 9,289,946 B2 | 3/2016 | Perez et al. |
| 2013/0034410 A1* | 2/2013 | Heise ............ G01N 35/04 414/222.13 |
| 2017/0113799 A1 | 4/2017 | Kovac et al. |
| 2019/0389064 A1* | 12/2019 | High ............ B25J 13/08 |

(Continued)

FOREIGN PATENT DOCUMENTS

| CN | 106930515 B | 4/2019 |
| KR | 101914614 B1 | 11/2018 |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Kenneth M Lo
*Assistant Examiner* — Istiaque Ahmed
(74) *Attorney, Agent, or Firm* — L. Jeffrey Kelly

(57) ABSTRACT

A method, computer system, and a computer program product for identifying and rectifying one or more defects on a structure is provided. The present invention may include identifying the one or more defects on the structure. The present invention may then include dynamically creating one or more magnetic paths for one or more 3D printer vehicles to travel to one or more locations of the identified one or more defects associated with the structure, wherein one or more temporary magnetic coil arrays associated with the structure are utilized to create the one or more magnetic paths. The present may further include rectifying the identified one or more defects on the structured by utilizing the one or more 3D printer vehicles, wherein the one or more 3D printer vehicles utilize 3D printing methods to rectify the identified one or more defects on the structure.

12 Claims, 8 Drawing Sheets

(56) References Cited

U.S. PATENT DOCUMENTS

| | | | |
|---|---|---|---|
| 2020/0306989 A1* | 10/2020 | Vogel | G05D 1/0261 |
| 2021/0019696 A1* | 1/2021 | Zhang | G06Q 10/08 |
| 2021/0214901 A1* | 7/2021 | Flitsch | B33Y 50/02 |
| 2021/0241228 A1* | 8/2021 | Tazume | G06Q 10/08355 |

OTHER PUBLICATIONS

Prusa, "The first printer to automatically correct its geometry in all axes (Update: New Video)", Prusaprinters blog, Sep. 21, 2016, 2 pages, https://blog.prusaprinters.org/first-printer-to-automatically-correct-geometry-in-all-axes/.

MIT, "Smart Self-correcting 3D printer invented by MIT", Patent Yogi LLC, printed on Sep. 4, 2019, 6 pages, https://patentyogi.com/latest-patents/smart-self-correcting-3d-printer-invented-by-mit/.

Carroll, "The intersection of 3-D printing and machine learning", College of Engineering, Carnegie Mellon University, Jun. 1, 2018, 4 pages, https://engineering.cmu.edu/news-events/news/2018/06/01-intersection-scime.html.

* cited by examiner ated with the structure, wherein one or more temporary magnetic coil arrays associated with the structure are utilized to create the one or more magnetic paths. The present may further include rectifying the identified one or more defects on the structured by utilizing the one or more 3D printer vehicles, wherein the one or more 3D printer vehicles utilize 3D printing methods to rectify the identified one or more defects on the structure.
THREE DIMENSIONAL PRINTING VEHICLE-BASED AUTO-CORRECTION IN A STRUCTURE

BACKGROUND

The present invention relates generally to the field of computing, and more particularly to three dimensional (3D) printing.

Three dimensional (3D) printing has recently increased in popularity, where different materials may be utilized to generate a 3D printing object, item and/or structure. For example, there has been a surge in the use of metals in 3D printing to create multiple items and/or structures.

SUMMARY

Embodiments of the present invention disclose a method, computer system, and a computer program product for identifying and rectifying one or more defects on a structure. The present invention may include identifying the one or more defects on the structure. The present invention may then include dynamically creating one or more magnetic paths for one or more 3D printer vehicles to travel to one or more locations of the identified one or more defects associated with the structure, wherein one or more temporary magnetic coil arrays associated with the structure are utilized to create the one or more magnetic paths. The present may further include rectifying the identified one or more defects on the structured by utilizing the one or more 3D printer vehicles, wherein the one or more 3D printer vehicles utilize 3D printing methods to rectify the identified one or more defects on the structure.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
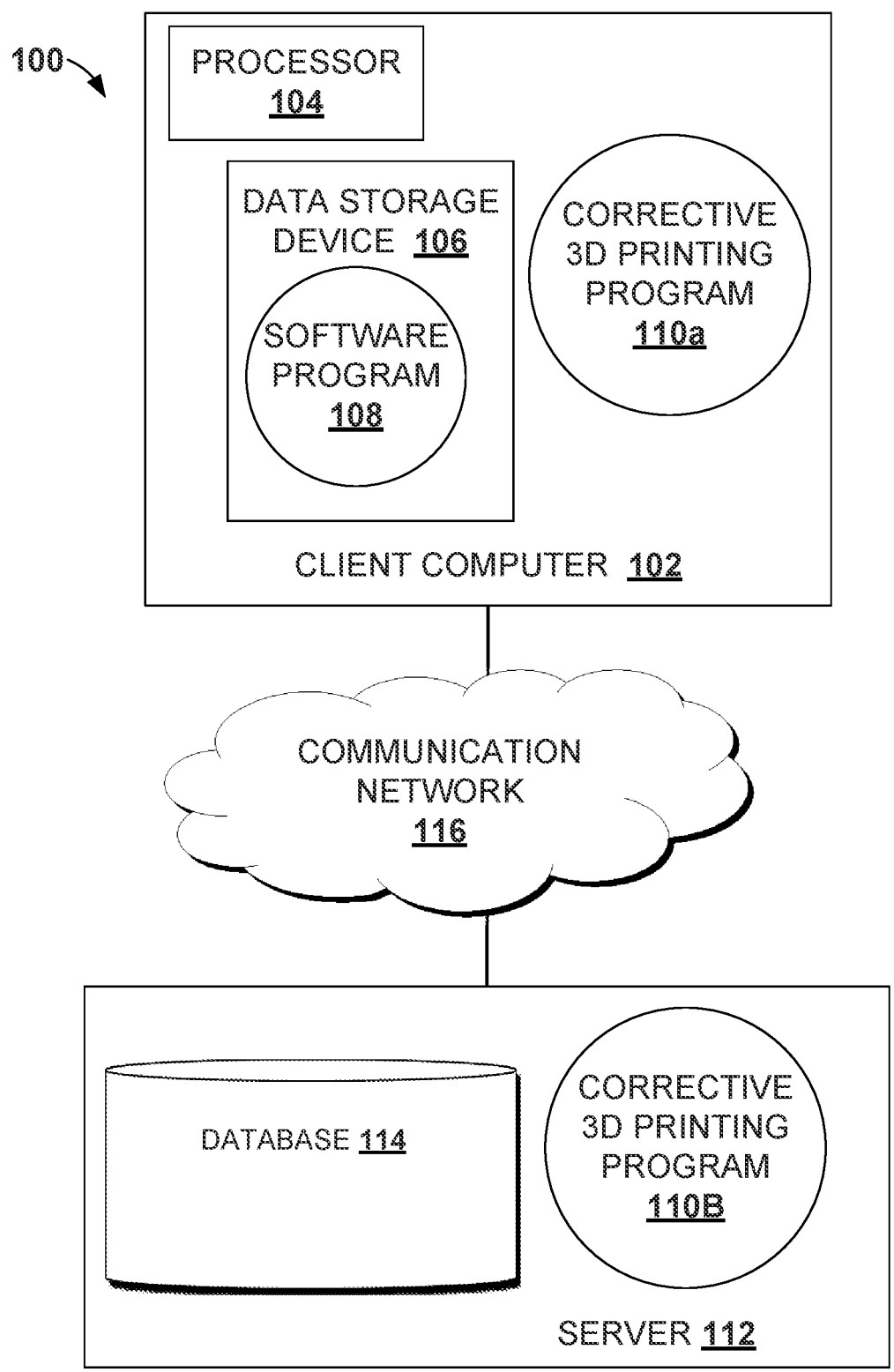
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for identifying and rectifying one or more defects on a structure. As such, the present embodiment has the capacity to improve the technical field of three dimensional (3D) printing by identifying and rectifying a defect, which is difficult to assess, in a structure created by 3D printing. More specifically, the corrective 3D printing program may analyze the structure and identify the defective location on the structure. Then, the corrective 3D printing program may determine and activate the appropriate 3D printer vehicle, which may then to mounted onto the structure. The corrective 3D printing program may then create a magnetic path, and then scan the structure as the 3D printer vehicle moves smoothly along the structure. The corrective 3D printing program may then utilize the 3D printer vehicle to rectify the defect through 3D printing.

As previously described, 3D printing has recently increased in popularity, where different materials may be utilized to generate a 3D printing object, item and/or structure. For example, there has been a surge in the use of metals in 3D printing to create multiple items and/or structures, such as a water pipe and a spacecraft structure, with a 3D printer.

If a gap or crack is detected in the structure, item and/or object (i.e., structure), correcting the gap or crack may be difficult depending on the location and/or size of the gap and/or crack. Therefore, it may be advantageous to, among other things, be utilized to correct a crack or defect causing by 3D printing in which the defect and/or crack is identified and corrected effectively, especially when correcting such defect and/or gap may be difficult or even close to impossible.

According to at least one embodiment, corrective 3D printing program may include mounting one or more 3D printer vehicles onto a structure in which there exists difficulty to rectify, and upon detecting the defect and/or crack in the structure, a magnetic path may be created dynamically for one or more 3D printer vehicles to reach at the defective location (e.g., site of the crack and/or defect). Therefore, the 3D printer vehicle may reach the defective location and rectify the problem.

According to at least one embodiment, the corrective 3D printing program may include one or more 3D printer vehicles that may be mounted on complex structures, where rectification is difficult, if any fault is detected. The 3D printer vehicles may move along the structure and may perform 3D printing to rectify the defective location (i.e., problem). The present embodiment may further include an inbuilt magnetic coil circuit array (i.e., temporary magnetic coil array) to dynamically create a magnetic path for the 3D printer vehicle, when any fault is detected in the structure with difficulty to rectify.

According to at least one embodiment, the corrective 3D printing program may utilize an Internet of Things (IoT) feed or device, a camera, sound wave, electrical signals, ultrasound, or any other technological devices to analyze the structure, identify the defective location, and approximate the size of the defect at the defective location. The corrective 3D printing program may then determine the quantity of 3D printer vehicles to be utilized to correct the defective location. The present embodiment may further include the creation of one or more magnetic paths to call multiple 3D printer vehicles to correct the defective location.

According to at least one embodiment, the corrective 3D printing program may identify the appropriate 3D printer vehicles which may reach the target defective location within the shortest possible time. Therefore, the corrective 3D printing program may perform the rectification in the shortest possible time.

According to at least one embodiment, the corrective 3D printing program may periodically validate if the 3D printer vehicles are working, and may correct the defective location, if applicable. If the 3D printer vehicles are not working, an administrator or authorized representative may be notified to rectify the 3D printer vehicles, while a secondary magnetic path may be created to retract the defective 3D printer vehicles.

According to at least one embodiment, the corrective 3D printing program may be integrated into a software program performing a 3D printing method. In other embodiments, the corrective 3D printing program may be performed after the completion of the 3D printing for a structure. As such, the 3D printing and the corrective 3D printing program may separate.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a corrective 3D printing program 110a. The networked computer environment 100 may also include a server 112 that is enabled to run a corrective 3D printing program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the corrective 3D printing program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the corrective 3D printing program 110a, 110b (respectively) to identify and rectify defects in a structure created by 3D printing. The corrective 3D printing method is explained in more detail below with respect to FIGS. 2-6.

Figure 2:
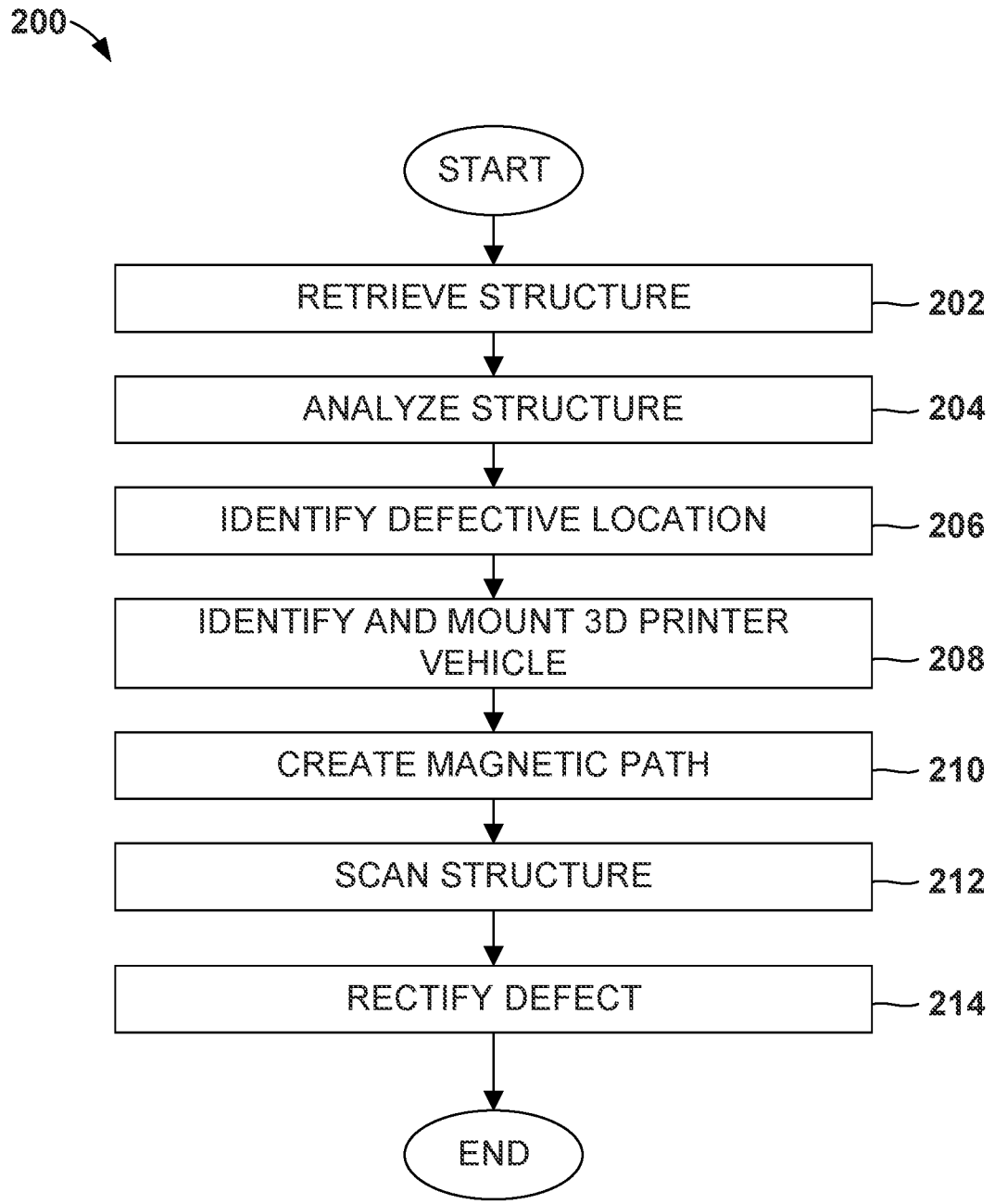
FIG. 2 is an operational flowchart illustrating a process for identification and rectification of a defect caused during 3D printing according to at least one embodiment.

Referring now to FIG. 2, an operational flowchart illustrating the exemplary identification and rectification process 200 for a 3D printing defect used by the corrective 3D printing program 110a, 110b according to at least one embodiment is depicted.

At 202, a structure is retrieved. The structure, which includes tangible or physical items and/or objects, may be retrieved by a user and administrator, and may be placed in an actual location, where the corrective 3D printing program 110a, 110b may be utilized to commence the identification and rectification process 200. The structure may include an appropriate array of temporary magnetic coils (i.e., inbuilt magnetic coil arrays).

In at least one embodiment, a machine programmable by one or more computers (e.g., robot) may be utilized to automatically retrieve the structure and place the structure in an actual location for the corrective 3D printing program 110a, 110b to commence the identification and rectification process 200. The corrective 3D printing program 110a, 110b may send a set of instructions to an external software program associated with the machine thereby guiding the machine on which structure to retrieve and place in an actual location for the corrective 3D printing program 110a, 110b.

Prior to retrieval into the corrective 3D printing program 110a, 110b, utilizing an external software program in which three dimensional (3D) printing is implemented, a structure may be created. In 3D printing, a digital 3D model (e.g., computer-aided design (CAD) model) of a structure is used to build a tangible 3D structure by successively adding material layer by layer (i.e., additive manufacturing). Each layer may be added as a precise cross-section until the final tangible 3D structure is completely built. While creating or building the structure via 3D printing, an appropriate array of temporary magnetic coils may be placed on, or laid over, the structure. An exemplary diagram 400 for the elevated and plan views of the temporary magnetic coils on the structure will be described in greater detail below with respect to FIG. 4.

In at least one embodiment, the structure may be built manually or by utilizing other manufacturing methods (e.g., repetitive manufacturing, discrete manufacturing, metal working manufacturing process, shearing and forming manufacturing process, machine manufacturing process). Regardless of the manufacturing method or process utilized to create the structure, an appropriate array of temporary magnetic coils may be placed on the built structure to enable one or more 3D printer vehicles to identify and rectify defects associated with the structure by utilizing 3D printing.

In at least one embodiment, the temporary magnetic coils may be placed on the structure at a later time after the building of the structure has been completed. In some other embodiments, the temporary magnetic coils may be placed on the structure after the structure was built, and before the commencement of the identification and rectification process 200. In such embodiments, the rectification of a defect and/or crack in the structure may be performed 3D printing.

For example, a technician retrieves a Water Pipe Q, which was built via 3D printing in a neighboring laboratory, and places Water Pipe Q in Lab A for the corrective 3D printing program 110a, 110b to commence the identification and rectification process 200. When the Water Pipe Q was previously attached to a water intake system, the water pressure in the water intake system dropped more than 15 pounds per square inch (PSI). Due to the curved shaped of Water Pipe Q, and the striated patterns on the surface of Water Pipe Q, fixing structural defects on Water Pipe Q is difficult and close to impossible. Therefore, one of the technicians from the neighboring laboratory brought Water Pipe Q to Lab A.

Next, at 204, the structure is analyzed. The corrective 3D printing program 110a, 110b may utilize an external technological device and/or sensors (e.g., Internet of Things (IoT) feed, a camera feed, sound wave, electrical signals and ultrasound) (i.e., external computing device) to analyze and/or evaluate the structure. The external computing device may analyze the structure to identify any defects and/or cracks in the structure (i.e., determine the presence of any defects and/or cracks) by utilizing image analysis and collect data on the defects and/or cracks on the structure (i.e., defect data), which may have occurred during the 3D printing of the structure.

In at least one embodiment, the corrective 3D printing program 110a, 110b may utilize an external image analysis software program to identify and measure features from any image received by the camera feed to categorize the image received.

In some embodiments, the corrective 3D printing program 110a, 110b may utilize external sound wave sensors (e.g., acoustic wave sensors, ultrasonic sensors) to measure the distance to a structure and/or the shape and/or size of a structure by using sound waves which may include sound detector (e.g., microphone) and an oscillating field that creates a mechanical or sound wave that propagates to and/or through the structure at a specific frequency, and may then be bounced back. By recording the elapsed time from the generation of the sound to the reverberation of the sound wave to calculate distance, size and shape.

In at least one other embodiment, the corrective 3D printing program 110a, 110b may utilize electrical field sensors to emit an electrical wave, and depending on the strength of the electric wave when bounced back to the sensor, the electrical field sensor may identify the materials that compose the structures, as well as the size of the structure.

In at least one embodiment, the corrective 3D printing program 110a, 110b may utilize the external computing device on a periodic basis. In some embodiments, the corrective 3D printing program 110a, 110b may utilize the external computing device for each structure, or each type of structure that is retrieved.

In another embodiment, where the 3D printing and the corrective 3D printing program 110a, 110b are integrated, the corrective 3D printing program 110a, 110b may utilize the external computing device for each structure created and/or built by the integrated 3D printing process.

Continuing with the previous example, the corrective 3D printing program 110a, 110b utilizes a camera to retrieve images on Water Pipe Q. The images are divided into features, such as color, shape, size, and each feature is then analyzed by an external image analysis software program. A technician from Lab A also utilizes a high air pressure regulator to release high air pressure into Water Pipe Q, when connected to the smart monitor leak detector. Since the smart monitor leak detector includes a transducer that is sensitive to sounds emitted from Water Pipe Q, the smart monitor leak detector detects the amount of leaks in Water Pipe Q.

Then, at 206, a defective location is identified. Based on the analysis performed by the external computing device, one or more locations with a defect and/or crack (i.e., defective location) in the structure may be identified. The external computing device may alert and/or notify the corrective 3D printing program 110a, 110b of the amount of defects, the particular location of each defect, and the size of each defect (i.e., defect data) via the communication network 116.

In at least one embodiment, the external computing device may alert the corrective 3D printing program 110a, 110b immediately when a defect has been identified in the structure. In some embodiments, the external computing device may wait until the entire analysis of the structure has been completed, and may then generate a list of identified defects that is transmitted to the corrective 3D printing program 110a, 110b. The list of identified defects may be in the textual form (e.g., table, chart) and/or visual form. In textual form, the list may include the location of each defect (i.e., defective location), the total amount of defects, and the size of each defect. In visual form, the external computing device may transmit a visual representation (e.g., picture) of the structure with a marking (e.g., dot, X mark) to indicate the defective location, and next to the marking may be the size of the defect. The number of markings may indicate the amount of defects on the structure. In some embodiments, the visual representation may include a numerical value (i.e., defect number) on each of the defective locations to identify that particular defective location, if multiple defective locations exist on the structure.

Continuing with the previous example, the corrective 3D printing program 110a, 110b identified three defects on Water Pipe Q. As such, the corrective 3D printing program 110a, 110b presents, to the user, a visual representation of Water Pipe Q in which an a red number ranging from 1 to 3 in placed the defective location, and the following corresponding Table 1 identifying the size of each defect:

TABLE 1

| Defect Number | Size (inches) |
| --- | --- |
| 1 | 0.241 inches |
| 2 | 0.139 inches |
| 3 | 0.0075 inches |

Then, at 208, an appropriate 3D printer vehicle is identified and mounted. The corrective 3D printing program 110a, 110b may evaluate the identified defective location and any corresponding data related to the size and the number of defects to determine the nearest possible 3D printer vehicle, and the number of 3D printer vehicles that may be utilized to rectify the identified defect.

A 3D printer vehicle (e.g., automated guided vehicle) may include a computer, which may receive and send data via a communication network 116 to the user's device (e.g., user's computer 102), as well as 3D printing components (e.g., cartridge, filament, nozzle, hot end, extruder, cooling fan, heated bed, z-resolution, printer display) that may be utilized to rectify defects via 3D printing. In at least one embodiment, the 3D printer vehicle may also include a camera for camera-based imaging in which the 3D printer vehicle may observe the structure and evaluate such structure in real time. In at least one other embodiment, the 3D printer vehicle may include a rim and a smooth surface to connect with the surface of a structure, and use a magnetic path to travel along the structure.

To identify the appropriate 3D printer vehicle, the corrective 3D printing program 110a, 110b may further evaluate the location of each 3D printer vehicle and determined which 3D printer vehicle may reach the defective location in the shortest period of time to rectify the defect in the shortest possible time.

In at least one embodiment, the appropriate 3D printer vehicle may be identified by an emitted signal or alert from the parking spaces associated with the identified 3D printer vehicle. In some embodiments, the corrective 3D printing program 110a, 110b may send a signal and/or notification to the computing device (e.g., local computing device, remote computing device) associated with user of the corrective 3D printing program 110a, 110b to indicate the appropriate 3D printer vehicle based on the identified defective location of the structure.

The corrective 3D printing program 110a, 110b may then mount, with intervention from humans (e.g., user, administrator), robotics or anther computing system, the appropriate 3D printer vehicle onto the structure to rectify the defect. The 3D printer vehicle may be mounted on a rail, rack, gear or any mechanism in which the 3D printer vehicle may be able to travel through a magnetic path on the structure. An exemplary diagram 500 for side view of the mounted 3D printer vehicle on the structure will be described in greater detail below with respect to FIG. 5. The 3D printer vehicles may connect wirelessly with a remote computing system to control the movement of the 3D printer vehicle(s). For example, in a bridge in which there are some critical area located near the trusses, the land-based 3D printer vehicle may unable to reach the structural trusses and rectify the defects. As such, the land-based 3D printer vehicles may have multiple 3D printer vehicles attached to the bridge structure that are connected to a remote computing system. The remote computing system may control the movements of these 3D printer vehicles. Therefore, the corrective 3D printing program 110a, 110b may identify any defects and the 3D printer vehicles, under the operation of a remote computing system, may follow the previously created array of temporary magnetic coils to travel through the created magnetic path and rectify the defect.

Continuing with the previous example, based on the defective locations for each of the three defects on Water Pipe Q, the corrective 3D printing program 110a, 110b identified three different 3D printer vehicles that may be utilized to correct the three defects. The identification of the 3D printer vehicle were then indicated on the computing device associated with the user, and the user mounts each of the three identified 3D printer vehicles on the surface of the Water Pipe Q.

Then, at 210, a magnetic path is created. Once the number of 3D printer vehicle(s) and the defective location are identified, the corrective 3D printing program 110a, 110b may activate the inbuilt temporary magnetic coils within the structure, thereby creating a magnetic path to the defective location for each 3D printer vehicle. Additionally, the corrective 3D printing program 110a, 110b may activate each 3D printer vehicle identified to rectify the defect. As such, the 3D printer vehicle may slide along the structure by utilizing the magnetic path. An exemplary block diagram 600 depicting the flow of the 3D printer vehicle on a structure will be described in greater detail below with respect to FIG. 6.

In at least one embodiment, a magnetic field may be created by the structure thereby creating a magnetic levitation effect with the 3D printer vehicle. Therefore, the 3D printer vehicle may smoothly move through the structure.

Continuing with the previous example, the corrective 3D printing program 110a, 110b activates the inbuilt temporary magnetic coils laid over the Water Pipe Q thereby creating three magnetic paths to connecting the each mounted 3D printer vehicle to the defective location in which that particular 3D printer vehicle should rectify the identified defects in that defective location.

Then, at 212, the structure is scanned. Once the magnetic path is created and 3D printer vehicle is activated, the 3D printer vehicle may follow the magnetic path to the exact location of the defect. The 3D printer vehicle may include a camera or other scanning device (e.g., IoT structure sensors) to identify the exact location of the defect. While travelling to the exact location of the defect on the structure, the 3D printer vehicle may scan the structure to determine whether any additional defects, not previously identified (i.e., previously unidentified), are present on the structure.

In at least one embodiment, if additional defects are identified by the scan of the structure, the 3D printer vehicle may emit a signal and/or notification to the corrective 3D printing program 110a, 110b. The corrective 3D printing program 110a, 110b may then automatically determine whether the additional defect may be rectified by the 3D printer vehicle, or whether another 3D printer vehicle may be selected (or deployed) to rectify the additional defect. In some embodiments, the scanning device may determine whether there are any changes in the previously identified defects (e.g., increase in size), which may be transmitted to the corrective 3D printing program 110a, 110b for rectification.

In at least one embodiment, the scanning device utilized by the corrective 3D printing program 110a, 110b may collect data associated with the materials, shape, composition and other structural data associated with the structure to rectify the defect.

Continuing with the previous example, while traveling to the respective defective location, each of the 3D printer vehicles may utilize a camera to scan Water Pipe Q to determine whether additional defects, or changes to the previously identified defects, exists. None of the 3D printer vehicles discovered any changes to the previously identified defects, or any additional defects. The corrective 3D printing program 110a, 110b may also utilize IoT structure sensors to compile data that determines that Water Pipe Q is composed of galvanized iron with a striated pattern every three inches.

Then, at 214, the defect is rectified. The 3D printer vehicle may further utilize the data collected by scanning the structure to rectify the defect. As such, the 3D printer vehicle may utilize the data to implement 3D printing to correct or rectify the defect in the structure. Each defect may be rectified by successively adding layer by layer onto the defect, until the defect no longer exists.

In at least one embodiment, once the rectification of the defect has been completed, the 3D printer vehicle may then return to the respective parking area by following the magnetic path. In at least one more embodiment, the temporary magnetic coil (i.e., temporary magnetic circuit) in the structure may be deactivated, when the 3D printer vehicle has returned to the respective parking space.

In at least one embodiment, the parking space for each 3D printer vehicle may replace or fill the cartridge used by the 3D printer vehicle for 3D printing when correcting the defect.

Continuing with the previous example, based on the data compiled by the IoT structure sensors, the 3D printer vehicle repairs the three defects on Water Pipe Q with galvanized iron by utilizing 3D printing to successively add each layer. Additionally, since Defect Number 3 was located in the striated areas of Water Pipe Q, the 3D printer vehicle continues that same striated pattern, with galvanized iron, to correct that defect.

In the present embodiment, the defect on structure may be identified by a human prior to the retrieval of the structure. In such an instance, the human may determine that the defective location is difficult to reach and correct, thereby utilizing the corrective 3D printing program 110a, 110b to rectify the difficult defect.

In the present embodiment, if the temporary magnetic coils malfunction or inadequate to reach the defective location, the3D printer vehicle may utilize a laser path to travel along the structure to the defective location.

Figure 3:
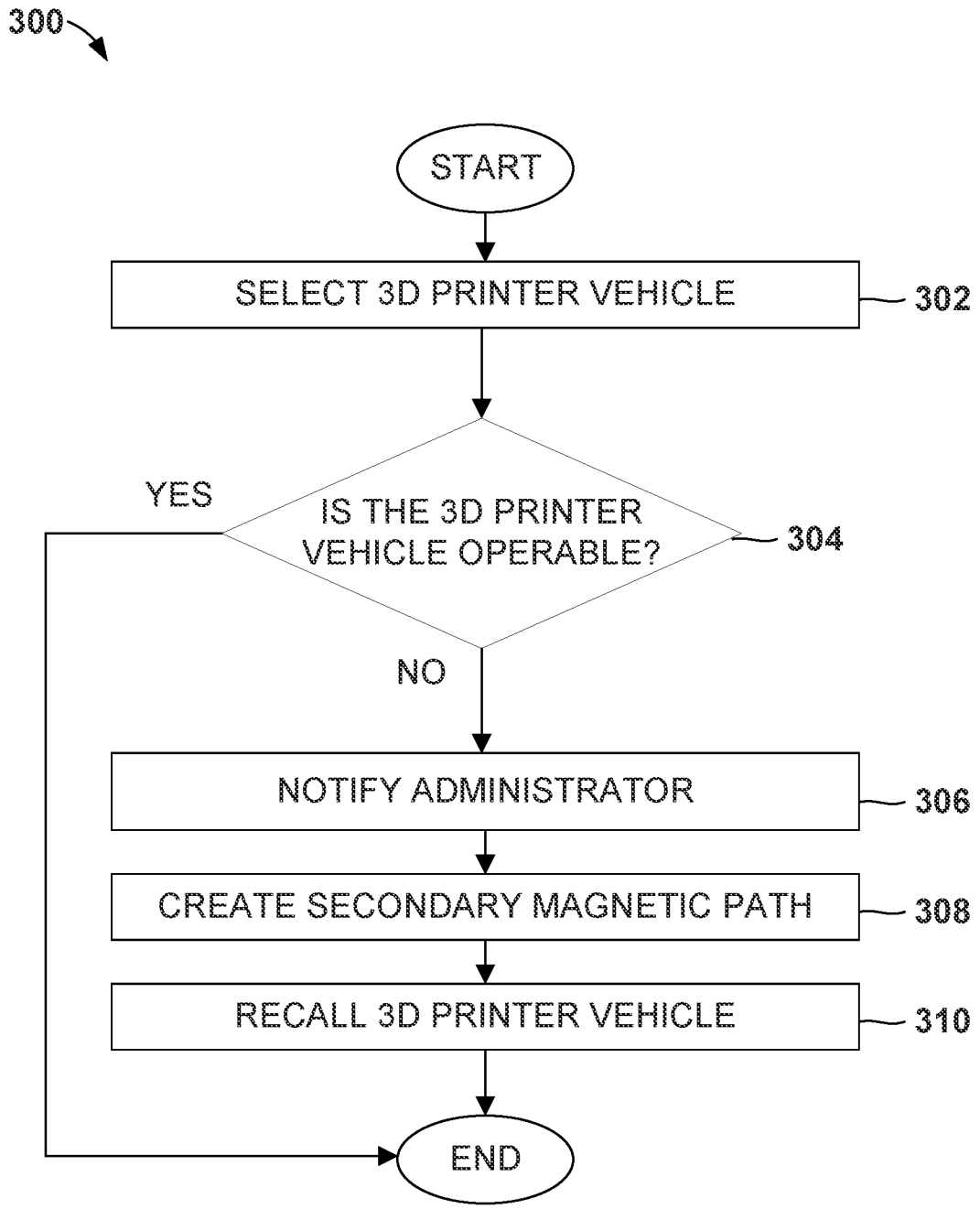
FIG. 3 is an operational flowchart illustrating a process for validation of a 3D printer vehicle according to at least one embodiment.

Referring now to FIG. 3, an operational flowchart illustrating the exemplary validation process 300 for a 3D printer vehicle used by the corrective 3D printing program 110a, 110b according to at least one embodiment is depicted.

At 302, a 3D printer vehicle is selected. The corrective 3D printing program 110a, 110b may automatically select a 3D printer vehicle. The corrective 3D printing program 110a, 110b may then send a message or alert to the 3D printer vehicle via communication network 116 thereby indicating that the 3D printer vehicle has been selected for the validation process 300. In at least one embodiment, the corrective 3D printing program 110a, 110b may randomly select the 3D printer vehicle. In some other embodiments, the corrective 3D printing program 110a, 110b may store in a database (e.g., database 114) a table including the dates that each 3D printer vehicle was last validated. The corrective 3D printing program 110a, 110b may select a 3D printer vehicle based on when the 3D printer vehicle was last validated (e.g., the 3D printer vehicle that was last validated at the earliest date is selected).

In at least one other embodiment, the corrective 3D printing program 110a, 110b may validate the 3D printer vehicle based on a validation schedule (e.g., every three months, two weeks, quarterly). As such, the corrective 3D printing program 110a, 110b may select each printer vehicle individually on the validation schedule and commence the validation process 300. In some embodiments, the validation schedule may be adjusted or modified manually by a user and/or administrator, or automatically by the corrective 3D printing program 110a, 110b based on usage, recent maintenance, computer glitches, or other identifiable issues that may affect the operability of the 3D printer vehicle. In at least one embodiment, the corrective 3D printing program 110a, 110b may utilize an external engine to search the manufacturer website, and any other websites (e.g., blogs, web forums) associated with the manufacturer, distributor, suppliers, users and/or other key roles associated with the 3D printer vehicle to retrieve any information associated with recalls, design and/or manufacturing defects, technical issues, troubleshooting and/or maintenance associated with the 3D printer vehicle. Based on the information gathered by the external engine, the corrective 3D printing program 110a, 110b may automatically modify the schedule to validate the 3D printer vehicles.

In at least one embodiment, a user or administrator may manually select a 3D printer vehicle to be validated by the corrective 3D printing program 110a, 110b. For example, if the user determines that 3D Printer Vehicle Z is operating improperly, the user can indicate to the corrective 3D printing program 110a, 110b by selecting the "Validation" button located in the settings, and the corrective 3D printing program 110a, 110b may promptly commence the validation process 300 on 3D Printer Vehicle Z.

For example, due to the high volume of 3D printing performed by the corrective 3D printing program 110a, 110b, every two days, at least two 3D printer vehicles are randomly selected for validation. As such, 3D Printer Vehicle 1 and 3D Printer Vehicle 2 are selected by the corrective 3D printing program 110a, 110b. 3D Printer Vehicle 1 is located in the parking spaces when selected, and 3D Printer Vehicle 2 is traveling to a defective location on a retrieved structure.

At 304, the corrective 3D printing program 110a, 110b determines whether the 3D printer vehicle is operable. In at least one embodiment, the corrective 3D printing program 110a, 110b may periodically check the validity of each 3D printer vehicle to determine if the 3D printer vehicle is operable (i.e., operating appropriately or working) thereby be able to rectify a defect when selected.

After the 3D printer vehicle is selected, the corrective 3D printing program 110a, 110b may perform a diagnostic test on various components (e.g., cartridge levels, filler material levels, or other components utilized to perform 3D printing to correct a detected defect) and functions of the 3D printer vehicle (e.g., malfunctioning of 3D printer vehicle) to determine whether the 3D printer vehicle is operable via a communication network 116.

During the diagnostic test, the corrective 3D printing program 110a, 110b may automatically check the cartridge levels and/or the filler materials associated with the selected 3D printer vehicle. The corrective 3D printing program 110a, 110b may then check the mechanical components associated with the selected 3D printer vehicle to determine whether any components are missing, misplaced, or defective that may affect the functioning of the 3D printer vehicle. In at least one embodiment, malfunctioning of the 3D printer vehicle may include a computer or technical glitch that may prohibit the 3D printer vehicle from moving away from the parking spaces and/or moving along one or more magnetic paths on the structure.

In at least one embodiment, the 3D printer vehicle may be temporarily deactivated when the diagnostic testing is conducted thereby pausing the 3D printer vehicle if the 3D printer vehicle is currently working on a structure. In other embodiments, the corrective 3D printing program 110a, 110b may perform the diagnostic testing, regardless of whether the 3D printer vehicle is working on a structure, thereby not affecting the functioning of the 3D printer vehicle. In some other embodiments, the corrective 3D printing program 110a, 110b may determine that the 3D printer vehicle is working on a structure and may postpone the diagnostic testing until the 3D printer vehicle is no longer in use (e.g., returning to the appropriate parking space after the defect has been rectified, located at the appropriate parking space after the defect has been rectified) thereby not interrupting the identification and rectification process 200.

If the corrective 3D printing program 110a, 110b determines that the 3D printer vehicle is operable at 304, then the 3D printer vehicle validation process 300 is concluded.

Continuing the previous example, the corrective 3D printing program 110a, 110b performed a diagnostic testing on each of 3D Printer Vehicle 1 and 2. Based on the diagnostic testing, the corrective 3D printing program 110a, 110b determines that 3D Printer Vehicle 1 is operable, with a 91% cartridge level, 95% filler material and the mechanical components associated with 3D Printer Vehicle 1 functioning properly. As such, the 3D printer vehicle validation process 300 for 3D Printer Vehicle 1 concludes.

If, however, the corrective 3D printing program 110a, 110b determines that the 3D printer vehicle is inoperable at 304, then an administrator is notified at 306. The corrective 3D printing program 110a, 110b may then emit an signal and/or alert via the communication network 116 to the previously identified administrator for the corrective 3D printing program 110a, 110b. Prior to the commencement of the validation process 300, an administrator associated with the corrective 3D printing program 110a, 110b may provide contact information (e.g., computing device identification) in which the administrator may be notified of any inoperable 3D printer vehicle.

In at least one embodiment, the corrective 3D printing program 110a, 110b may utilize Internet of Things (IoT) devices (e.g., smart speakers, wearable and smart appliances, smart televisions, smart security systems, virtual assistant device) to notify the administrator.

Continuing with the previous example, based on the diagnostic testing, the corrective 3D printing program 110a, 110b determines that 3D Printer Vehicle 2 has been deemed inoperable with a 10% cartridge level and 5% filler material. As such, an alert is sent to the tablet associated with the previously identified Administrator 2 to notify Administrator 2 of the inoperability of 3D Printer Vehicle 2.

Next, at 308, a secondary magnetic path is created. The corrective 3D printing program 110a, 110b may determine the shortest possible path for the 3D printer vehicle, which is inoperable, to return to the parking area for that particular 3D printer vehicle. In at least one embodiment, if the 3D printer vehicle was determined to be inoperable while rectifying a defect, then the corrective 3D printing program 110a, 110b may determine that the shortest possible path may be the same as the magnetic path initially used by the 3D printer vehicle to travel to the defective location on a structure. As such, the secondary magnetic path may be the same the initial magnetic path. In some embodiments, if the 3D printer vehicle was determined to be inoperable while rectifying a defect, then the corrective 3D printing program 110a, 110b may determine that the shortest possible path may be different from the magnetic path initially used by the 3D printer vehicle to travel to the defective location on a structure. As such, the corrective 3D printing program 110a, 110b may create a secondary magnetic path for the 3D printer vehicle. For example, if the 3D printer vehicle was traveling to multiple defective locations, then the corrective 3D printing program 110a, 110b may create a secondary magnetic path with the shortest path to the appropriate parking space. In some other embodiments, if the 3D printer was determined to be inoperable while in the appropriate parking space, then no secondary magnetic path may be created for the 3D printer vehicle since the 3D printer vehicle is already in the appropriate parking space.

Continuing with the previous example, since 3D Printer Vehicle 2 was in route to a defective location on a retrieved structure, the corrective 3D printing program 110a, 110b determines that the shortest path to the parking space for 3D Printer Vehicle 2 is the same magnetic path that 3D Printer Vehicle 2 is traveling on to the defective location. As such, no secondary magnetic path will have to be created for the 3D Printer Vehicle 2 to return to the appropriate parking space.

Then, at 310, the 3D printer vehicle is recalled. Once the corrective 3D printing program 110a, 110b determines that the 3D printer vehicle has to return to the parking space and the secondary magnetic path, or initial magnetic path, if applicable, has been created, then the corrective 3D printing program 110a, 110b may recall the 3D printer vehicle by sending a signal via a communication network 116 that the 3D printer vehicle should return to the parking space. The 3D printer vehicle may then cease current activity, and follow the magnetic path created to return the 3D printer vehicle to the appropriate parking space.

Continuing with the previous example, the corrective 3D printing program 110a, 110b sends a signal to the 3D Printer Vehicle 2. Upon receipt of the signal, the 3D Printer Vehicle 2 stops traveling to the defective location, and instead reverses course and travels back to the appropriate parking space.

In another embodiment, the corrective 3D printing program 110a, 110b may send instructions to a human (e.g., user, administrator) and a machine programmable by one or more computers (e.g., robot) to guide the human and/or machine on how to repair the inoperable 3D printer vehicle at the defective location. As such, the 3D printer vehicle may be temporarily paused while the repair is performed. As such, no magnetic path may be created, and once the repairs are completed, then the 3D printer vehicle may proceed to the defective location, or continue to rectify the defect.

In another embodiment, if the corrective 3D printing program 110a, 110b recalls a 3D printer vehicle deemed to be inoperable, the corrective 3D printing program 110a, 110b may immediately identify another appropriate 3D printer vehicle that is close in proximity to the defective location previously assigned to the 3D printer vehicle, now deemed inoperable, to rectify. The newly identified 3D printer vehicle may be then deployed by the corrective 3D printing program 110a, 110b to replace the now inoperable 3D printer vehicle and rectify the defect. Therefore, the corrective 3D printing program 110a, 110b may save time and resources to rectify the defect in the shortest possible time regardless of the 3D printer vehicle deemed inoperable.

Figure 4:
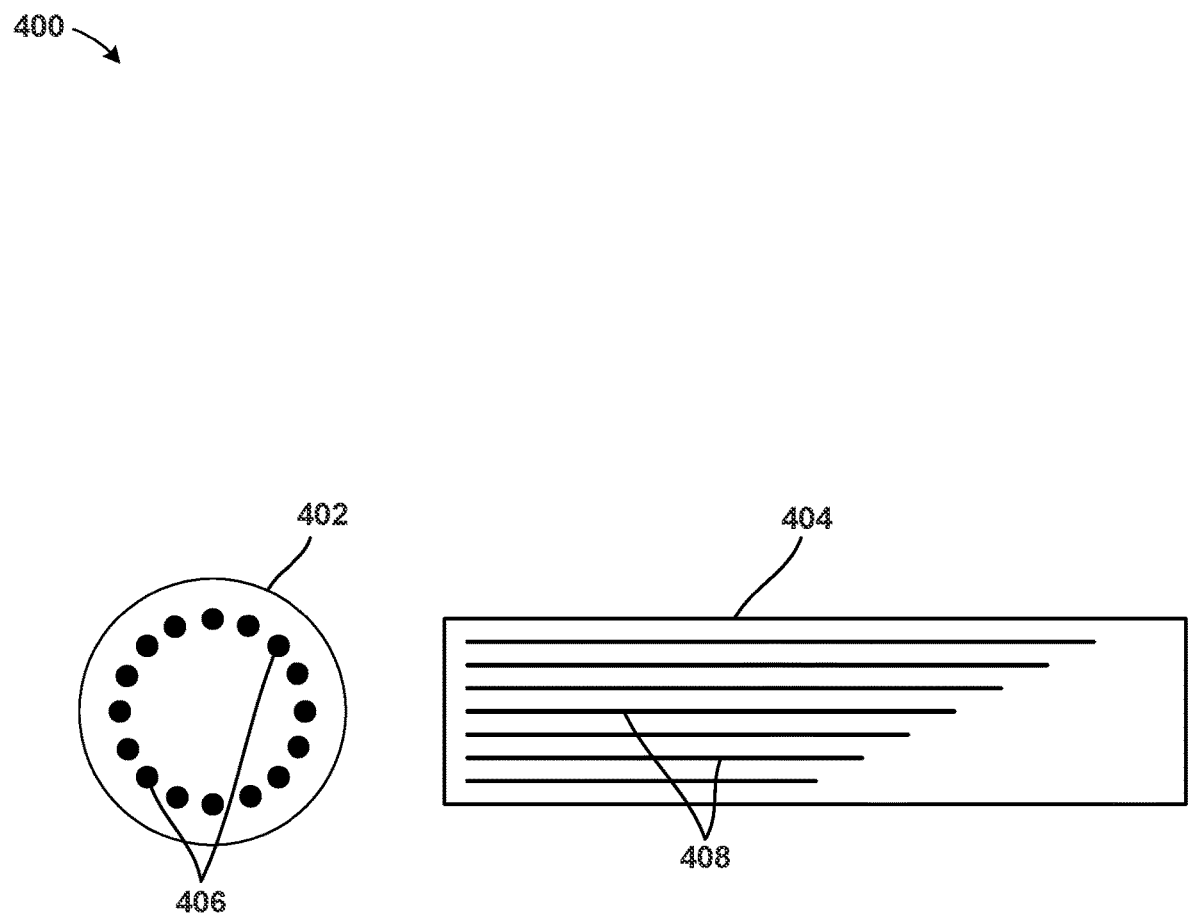
FIG. 4 is elevated and plan views of the temporary magnetic coils on a structure according to at least one embodiment.

FIG. 4 is elevated and plan views of the temporary magnetic coils in the structure used by the corrective 3D printing program 110a, 110b according to at least one embodiment is depicted. In FIG. 4, the structure may be depicted in three different views: side elevation and front elevation 402 and plan view 404. In each view, the temporary magnetic coils may be depicted differently. For example, in the side elevation and/or front elevation of the structure 402, the temporary magnetic coils 406 as dots within the structure, especially if the structure has a circular or cylindric shape. By contrast, in the plan view of the structure 404, the temporary magnetic coils 408 are lines and/or linear paths on any surface and/or side of the structure in which the 3D printer vehicle may travel.

Additionally, the circuit associated with the temporary magnetic coils may be closed thereby providing the possibility of creating a continuous magnetic path along with the path of the structure.

Figure 5:
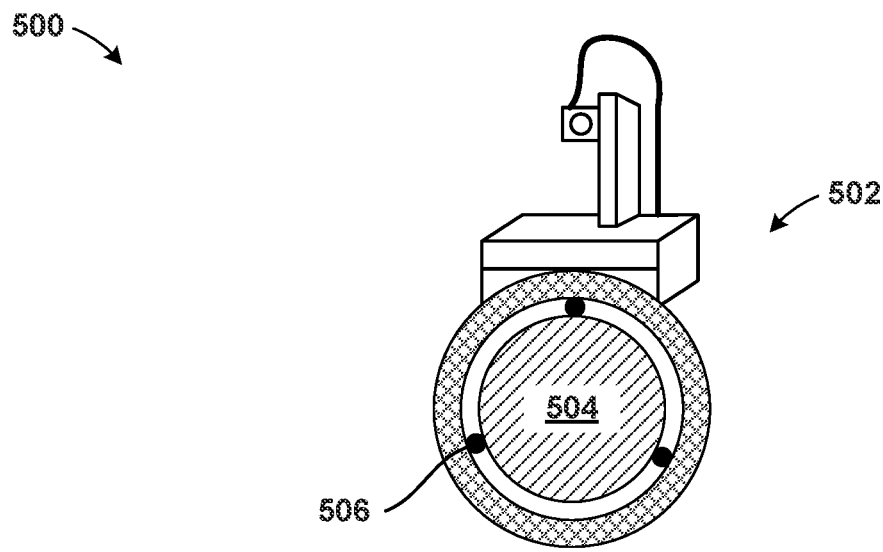
FIG. 5 is a side view of the mounted 3D printer vehicle on a structure according to at least one embodiment.

FIG. 5 is a side view of the mounted 3D printer vehicle 502 on a structure 504 used by the corrective 3D printing program 110a, 110b according to at least one embodiment is depicted. The 3D printer vehicle 502 may be mounted directly on the structure 504. When the 3D printer vehicle 502 mounts the structure 504, the 3D printer vehicle 502 may smoothly slide along the surface of the structure 504. A side view of the 3D printer vehicle mounted on the structure is indicated at 506.

Figure 6:
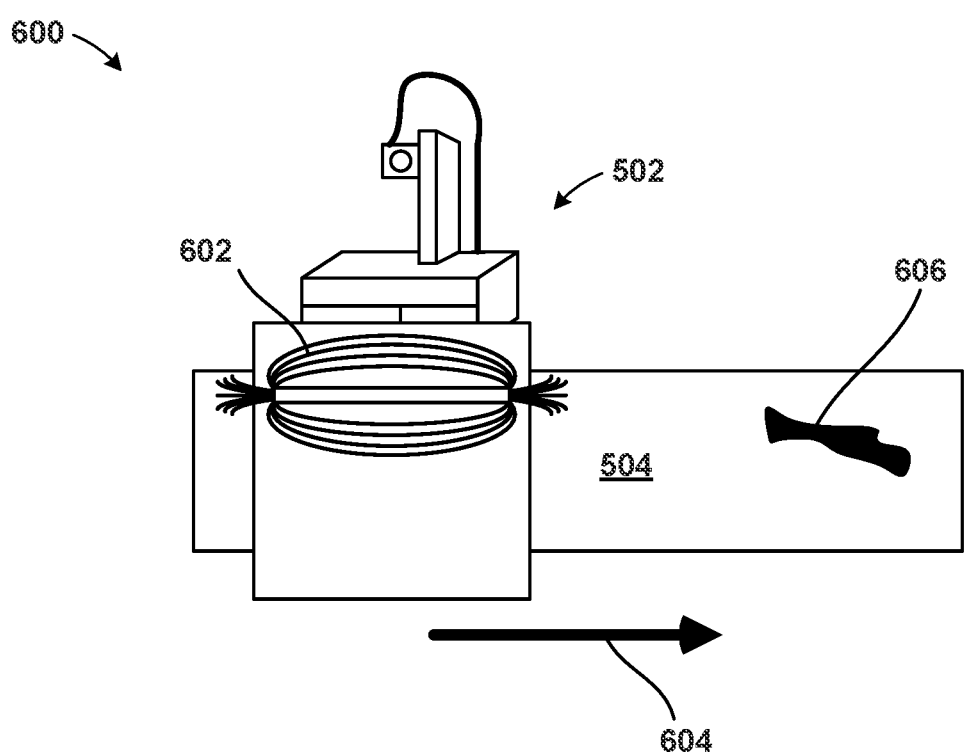
FIG. 6 is a block diagram depicting the flow of the 3D printer vehicle on a structure according to at least one embodiment.

FIG. 6 is a block diagram 600 depicting the flow of the 3D printer vehicle on a structure used by the corrective 3D printing program 110a, 110b according to at least one embodiment is depicted. A 3D printer vehicle 502 may be mounted on the structure 504. When a defect 606 is identified, the 3D printer vehicle 502 may follow the magnetic path 602 to travel towards a particular direction (i.e., movement path) 604 to the location of the defect 606 and rectify the defect 606 by performing 3D printing.

The corrective 3D printing program 110a, 110b may improve the functionality of the computer, the technology and/or the field of technology by utilizing inbuilt temporary magnetic coil circuit array to create one or more magnetic paths dynamically for the 3D printer vehicle to reach the defective location and rectify the defect. Further, the corrective 3D printing program 110a, 110b may periodically validate the operability of each 3D printer vehicle to determine whether the 3D printer vehicle may be able to rectify a defect when selected. The corrective 3D printing program 110a, 110b may also be utilized to reach and fix difficult locations on a structure, which the 3D printing device may initialize miss, or be unable to reach.

The corrective 3D printing program 110a, 110b may further identify and/or select a 3D printer vehicle based on the location of each 3D printer vehicle, and which 3D printer vehicle may be located closer (i.e., degree of closeness) to the defective location, thereby be able to correct the defect in the shortest period of time.

It may be appreciated that FIGS. 2-6 provide only an illustration of one embodiment and do not imply any limitations with regard to how different embodiments may be implemented. Many modifications to the depicted embodiment(s) may be made based on design and implementation requirements.

Figure 7:
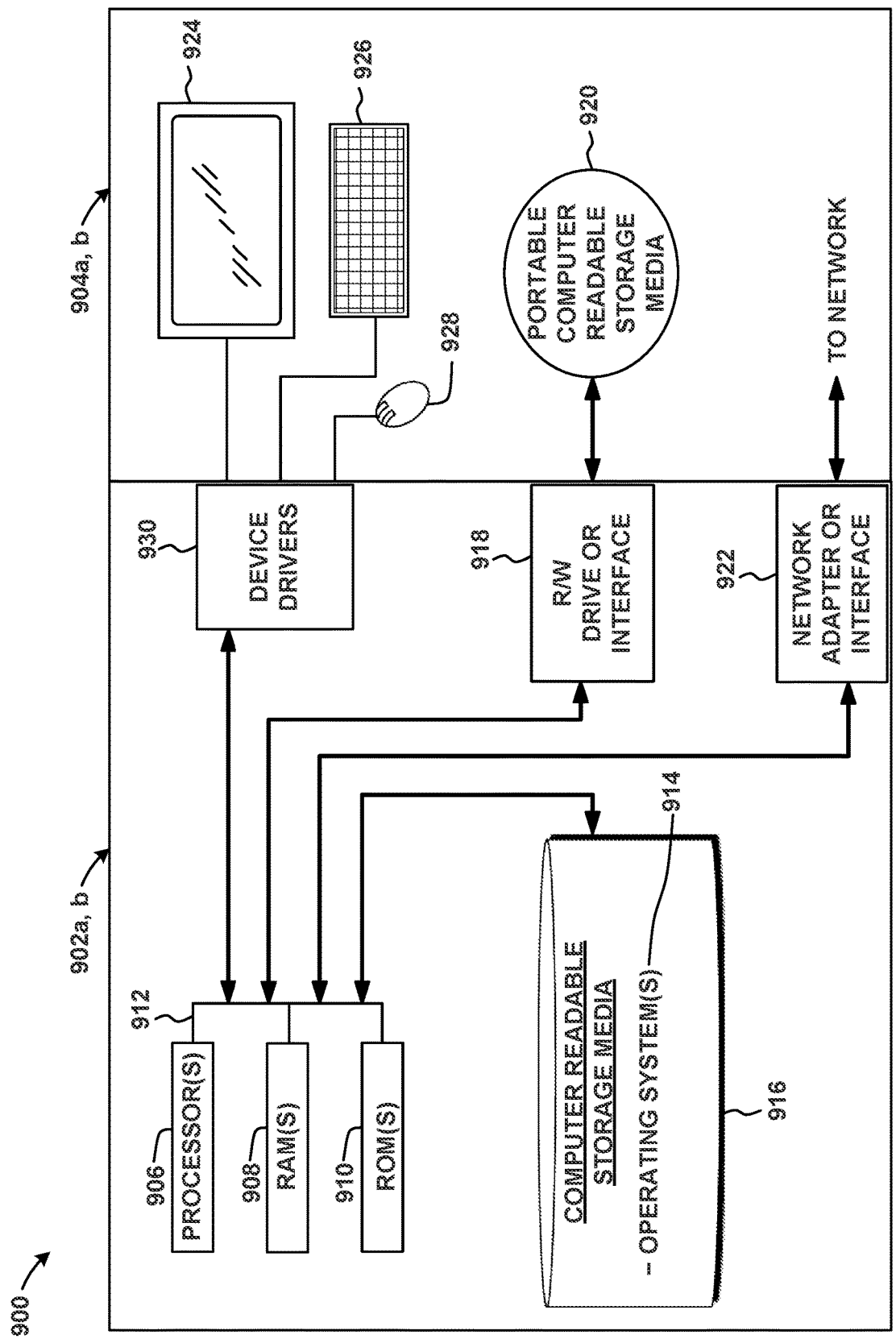
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the corrective 3D printing program 110a in client computer 102, and the corrective 3D printing program 110b in network server 112, may be stored on one or more computer-readable tangible storage devices 916 for execution by one or more processors 906 via one or more RAMs 908 (which typically include cache memory). In the embodiment illustrated in FIG. 8, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the corrective 3D printing program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the corrective 3D printing program 110a in client computer 102 and the corrective 3D printing program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the corrective 3D printing program 110a in client computer 102 and the corrective 3D printing program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
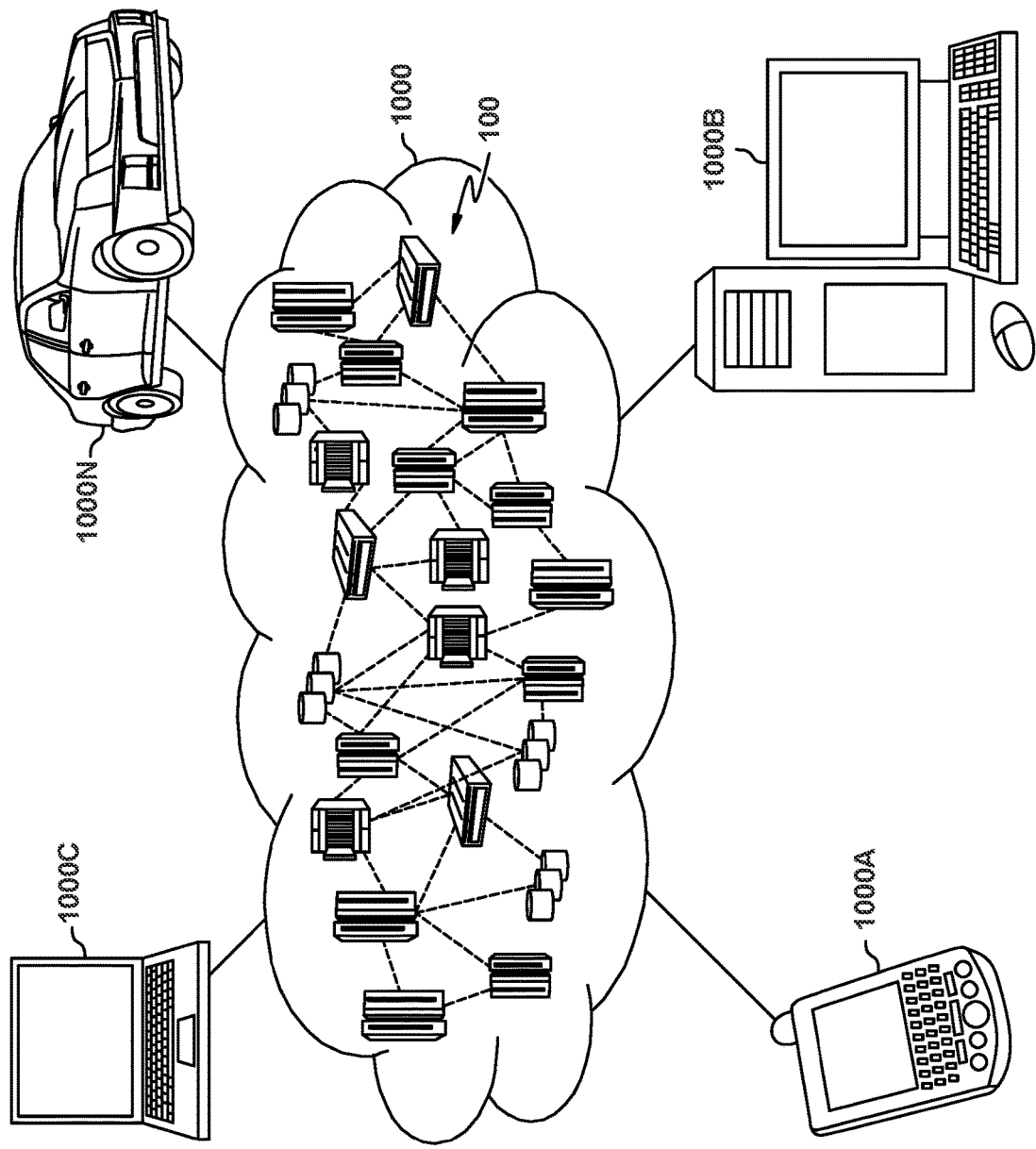
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Figure 9:
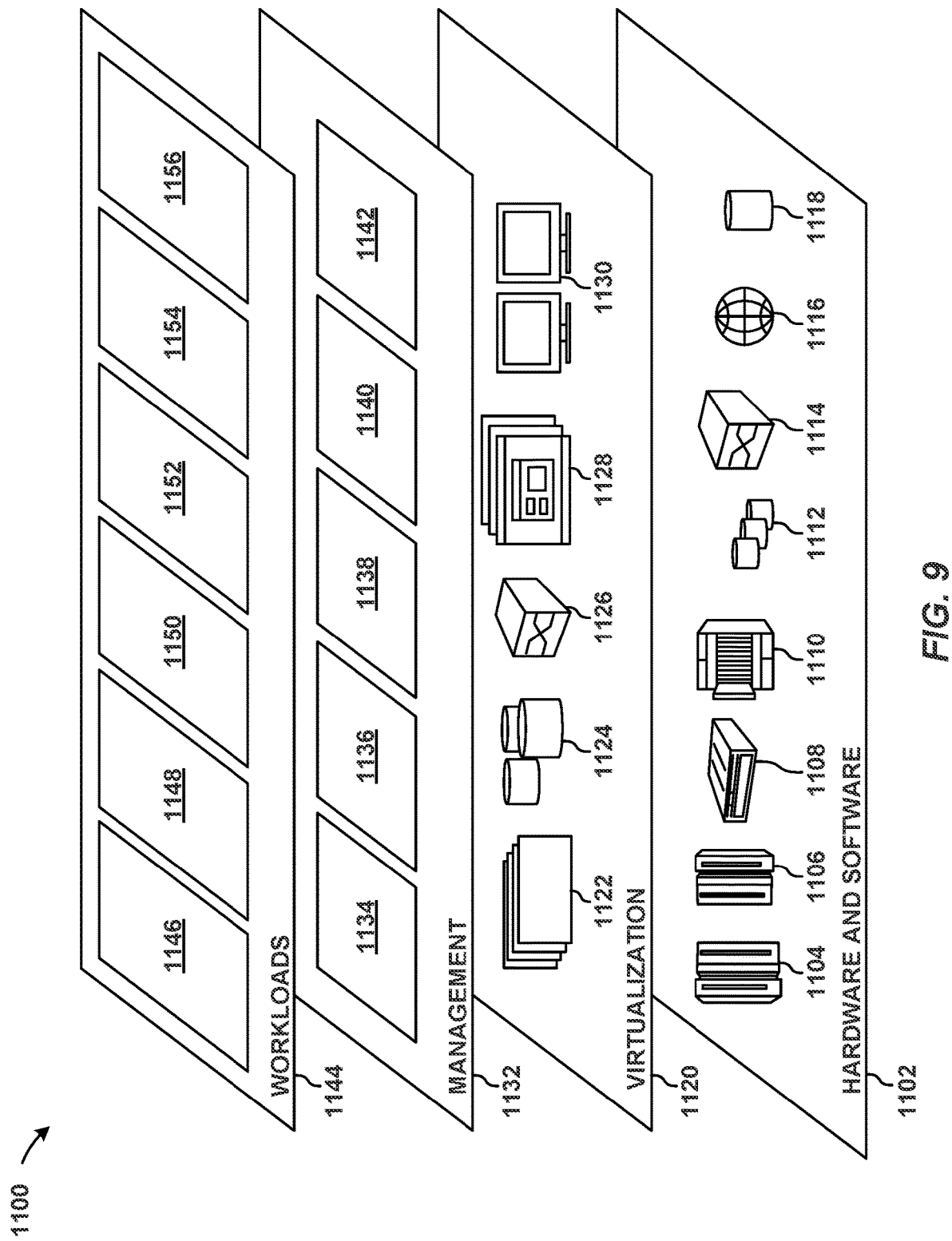
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and corrective 3D printing 1156. A corrective 3D printing program 110a, 110b provides a way to identify and rectify defects in a structure created by 3D printing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying one or more defects on a structure;
   dynamically creating one or more magnetic paths for one or more 3D printer vehicles to travel to one or more locations of the identified one or more defects on the structure, wherein one or more temporary magnetic coil arrays associated with the structure are utilized to create the one or more magnetic paths;
   rectifying the identified one or more defects on the structure by utilizing the one or more 3D printer vehicles, wherein the one or more 3D printer vehicles utilize 3D printing methods to rectify the identified one or more defects on the structure;
   identifying the one or more 3D printer vehicles to rectify the identified one or more defects on the structure based on a degree of closeness the one or more 3D printer vehicles are to the identified one or more defects on the structure; and
   mounting the identified one or more 3D printer vehicles onto the structure.

2. The method of claim 1, wherein identifying the one or more defects on the structure, further comprises:
   analyzing the structure by utilizing an external computing device; and
   in response to determining a presence of the one or more defects on the structure, identifying a plurality of defect data associated with the one or more defects.

3. The method of claim 1, wherein dynamically creating the one or more magnetic paths for the one or more 3D printer vehicles to travel to the one or more locations of the identified one or more defects on the structure, wherein the one or more temporary magnetic coil arrays associated with the structure are utilized to create the one or more magnetic paths further comprising:
   activating the one or more temporary magnetic coil arrays associated with the structure;
   creating a magnetic field associated with the structure, wherein a magnetic levitation effect is created with the one or more 3D printer vehicles; and
   creating a movement path for the one or more 3D printer vehicles to move on the structure.

4. The method of claim 1, further comprising:
   scanning the structure by utilizing a scanning device;
   identifying an exact location for each of the identified one or more defects on the scanned structure;
   determining whether one or more previously unidentified defects exist on the scanned structure by utilizing the scanning device;
   collecting, by the scanning device, a plurality of structural data associated with the scanned structure; and
   analyzing the collected plurality of structural data associated with the scanned structure to rectify the scanned structure.

5. A computer-implemented method comprising:
   identifying one or more defects on a structure;
   dynamically creating one or more magnetic paths for one or more 3D printer vehicles to travel to one or more locations of the identified one or more defects on the structure, wherein one or more temporary magnetic coil arrays associated with the structure are utilized to create the one or more magnetic paths;
   rectifying the identified one or more defects on the structure by utilizing the one or more 3D printer vehicles, wherein the one or more 3D printer vehicles utilize 3D printing methods to rectify the identified one or more defects on the structure;
   in response to rectifying the identified one or more defects on the structure, returning the one or more 3D printer vehicles to one or more parking spaces associated with the one or more 3D printer vehicles; and
   deactivating the one or more temporary magnetic coil arrays associated with the structure.

6. The method of claim 5, wherein identifying the one or more defects on the structure, further comprises:
   analyzing the structure by utilizing an external computing device; and in response to determining a presence of the one or more defects on the structure, identifying a plurality of defect data associated with the one or more defects.

7. The method of claim 5, wherein dynamically creating the one or more magnetic paths for the one or more 3D printer vehicles to travel to the one or more locations of the identified one or more defects on the structure, wherein the one or more temporary magnetic coil arrays associated with the structure are utilized to create the one or more magnetic paths further comprising:
   activating the one or more temporary magnetic coil arrays associated with the structure;
   creating a magnetic field associated with the structure, wherein a magnetic levitation effect is created with the one or more 3D printer vehicles; and
   creating a movement path for the one or more 3D printer vehicles to move on the structure.

8. The method of claim 5, further comprising:
   scanning the structure by utilizing a scanning device;
   identifying an exact location for each of the identified one or more defects on the scanned structure;
   determining whether one or more previously unidentified defects exist on the scanned structure by utilizing the scanning device;
   collecting, by the scanning device, a plurality of structural data associated with the scanned structure; and
   analyzing the collected plurality of structural data associated with the scanned structure to rectify the scanned structure.

9. A computer-implemented method comprising:
   identifying one or more defects on a structure;
   dynamically creating one or more magnetic paths for one or more 3D printer vehicles to travel to one or more locations of the identified one or more defects on the structure, wherein one or more temporary magnetic coil arrays associated with the structure are utilized to create the one or more magnetic paths;
   rectifying the identified one or more defects on the structure by utilizing the one or more 3D printer vehicles, wherein the one or more 3D printer vehicles utilize 3D printing methods to rectify the identified one or more defects on the structure;
   performing diagnostic tests on each of the one or more 3D printer vehicles to determine a degree of operability associated with each of the one or more 3D printer vehicles;
   notifying an administrator in response to identifying at least one of the one or more 3D printer vehicles is inoperable based on the diagnostic tests;
   creating a secondary magnetic path for the at least one of the one or more 3D printer vehicles identified as inoperable;
   one or more inoperable 3D printer vehicles moves on the structure; and
   recalling the one or more inoperable 3D printer vehicles.

10. The method of claim 9, wherein identifying the one or more defects on the structure, further comprises:
    analyzing the structure by utilizing an external computing device; and
    in response to determining a presence of the one or more defects on the structure, identifying a plurality of defect data associated with the one or more defects.

11. The method of claim 9, wherein dynamically creating the one or more magnetic paths for the one or more 3D printer vehicles to travel to the one or more locations of the identified one or more defects on the structure, wherein the one or more temporary magnetic coil arrays associated with the structure are utilized to create the one or more magnetic paths further comprising:
    activating the one or more temporary magnetic coil arrays associated with the structure;
    creating a magnetic field associated with the structure, wherein a magnetic levitation effect is created with the one or more 3D printer vehicles; and
    creating a movement path for the one or more 3D printer vehicles to move on the structure.

12. The method of claim 9, further comprising:
    scanning the structure by utilizing a scanning device;
    identifying an exact location for each of the identified one or more defects on the scanned structure;
    determining whether one or more previously unidentified defects exist on the scanned structure by utilizing the scanning device;
    collecting, by the scanning device, a plurality of structural data associated with the scanned structure; and
    analyzing the collected plurality of structural data associated with the scanned structure to rectify the scanned structure.

* * * * *